Nov. 17, 1936.   J. S. FORBES ET AL   2,061,028
VALVE
Filed May 14, 1935

INVENTORS.
JOHN S. FORBES
HARRY H. LAMAR
BY
ATTORNEY.

Patented Nov. 17, 1936

2,061,028

UNITED STATES PATENT OFFICE 2,061,028

VALVE

John S. Forbes, Pittsburgh, and Harry H. Lamar, Wilkinsburg, Pa., assignors to Kerotest Manufacturing Company, Pittsburgh, Pa., a corporation of Pennsylvania Application May 14, 1935, Serial No. 21,340

7 Claims. (Cl. 251—31)

Our invention relates to improvements in valves, and more particularly to valves known as diaphragm sealed valves and especially designed to be employed in connection with mechanical refrigeration apparatus and other apparatus in which light hydrocarbon gases and the like are utilized.

In diaphragm sealed valves of this character especially when they are employed in connection with mechanical refrigeration it is of the utmost importance that provision be made against any possible leakage through the valve, and at the same time the construction should be of such a character as to permit of the removal of the diaphragm or sealing element embodied therein without shutting off the fluid, and/or removing the valve from the line. Further requirements are, the provision of an efficient guide valve means and a construction enabling an unrestricted or full flow of the fluid through the valve structure.

Our invention contemplates a simple and compact valve structure embodying means for taking care of the above specified requirements.

In the accompanying drawing which illustrates an application of our invention:—

Figure 1:
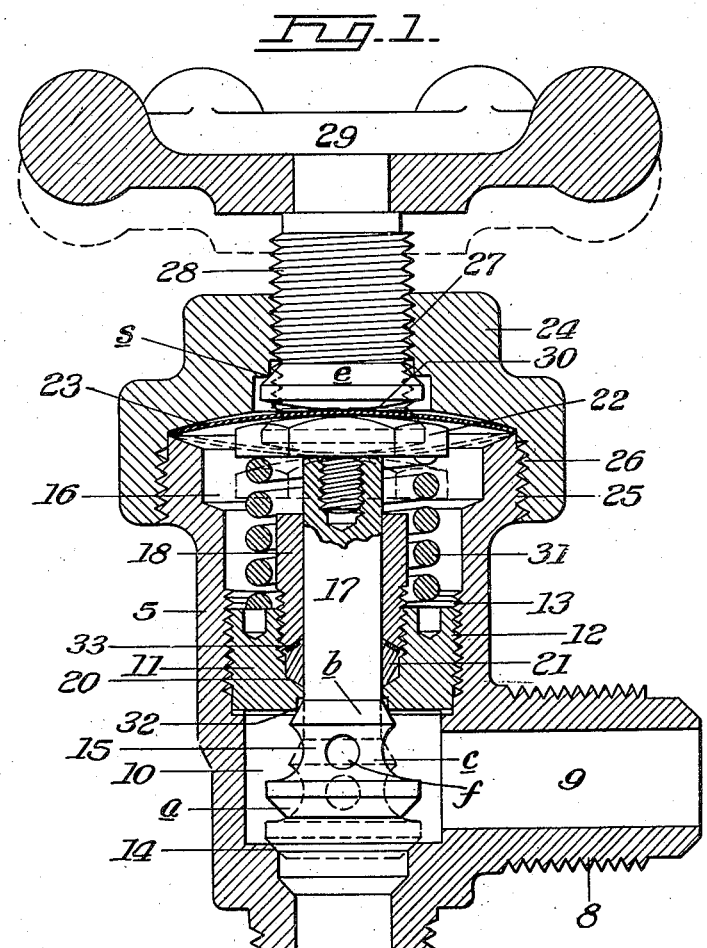
Figure 2:
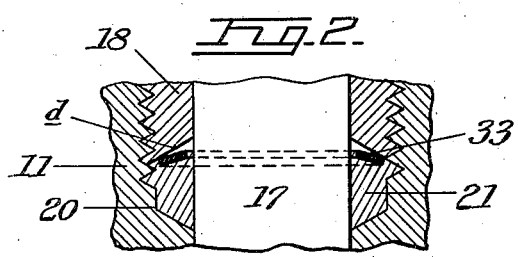

Fig. 1 is an enlarged longitudinal sectional view of a valve embodying our invention; and Fig. 2, an enlarged detail sectional view particularly showing the packing and the take-up means associated therewith.

Referring to the drawing, 5 designates generally a valve body or casing having a depending externally threaded portion or nozzle 6 formed with an inlet passage 7, and a laterally extending portion or nozzle 8 preferably externally threaded and having an outlet or discharge passage 9 therethrough. Each of the said passages 7 and 9 are in open communication with an enlarged valve chamber 10, the latter being positioned centrally of the casing and of considerable flow area. The upper end of the valve chamber is closed by a closure member 11 having external threads 12 for cooperation with internal threads 13 formed on the interior of the body.

14 designates a valve seat at the lower end of the valve chamber designed for cooperation with a contacting face $a$ of a valve 15. In addition to face $a$ valve 15 is formed with a seat contacting face $b$ and an annular reduced portion $c$. If desired the valve 15 may be provided with an opening $f$ designed to receive a tool (not shown) for the purpose of holding the valve against rotation in assembling some of the parts.

It will be noted that the closure member 11 divides the interior of the hollow body into the valve chamber and a supplemental or diaphragm chamber 16, and that the valve stem 17 extends through said closure member and into the diaphragm chamber 16. Positioned centrally of the closure member is a valve stem guide or sleeve 18; this sleeve 18 is of considerable length and provides an elongated bearing and guide for the valve stem and is also designed to exert a continuous pressure on a packing as hereinafter described.

The closure member is recessed to form a packing receiving pocket 20 adapted to receive a suitable packing 21 therein. The valve stem moves in the packing and one end of the stem is provided with a terminal head 22, said head preferably having a rounded surface for engagement with an imperforate diaphragm 23, the latter being designed to close the upper end of the supplemental chamber; the diaphragm is held in the desired position on the valve body by means of a bonnet or cap member 24 disposed on the upper end of the valve body. Said upper end and the interior of the cap or bonnet member have cooperating threaded portions 25 and 26 for securing the bonnet to the body. Cap 24 is formed with a threaded bore 27 adapted to receive a separable operating stem or member 28 having a wheel or its equivalent 29 secured thereto. The lower end of the operating or actuating stem is provided with an enlarged head having a rounded terminal 30 designed to engage the outer face of the diaphragm 23; the said stem and its head being alined coaxially with the valve stem 17 and its head 22.

31 designates a spring interposed between the upper end of the closure member 11 and the headed terminal 22 of the valve stem and functions to maintain the end 22 in contact with the diaphragm and exert pressure against movement of the valve to closed position, and to raise the valve off its seat when the operating stem is retracted.

Closure member 11 is formed with a valve seat 32 adapted to contact with the contacting face $b$ of the valve when the valve is in full open position thereby providing a contact for effecting a seal or a partial seal between the valve chamber and the supplemental chamber. By the employment of the packing 21 an additional means is provided for preventing the leakage of fluid from the valve chamber into the supplemental chamber and in order to insure a proper functioning of the packing 21 at all times, we have provided an automatic take-up spring metal washer 33;

this washer or ring is made of very thin metal and is located between the inner end of the guide or bearing sleeve 18 and the packing 21. The employment of this washer as shown in conjunction with the continuous pressure exerted thereon by the sleeve 18 will always assure an efficient packing of the stem even when the packing element 21 becomes dry and shrinks or is deformed.

The packing and the take-up ring or washer associated therewith are particularly shown by the detail view Fig. 2. A reference to this figure shows that adjacent the inner end the sleeve 18 is formed with a bevelled face d designed to contact with the take-up washer; the figure shows the packing shrunk somewhat with the take-up washer however exerting pressure thereon to effect a seal. It will be understood that the sleeve 18 may be moved inwardly when necessary to compress the packing after wear or shrinkage takes place.

We are aware that a packing element has been employed in connection with a helically coiled spring surrounding a valve stem and interposed between a head on the stem and the packing element or a movable member in contact with the packing, but such a construction provides a variable pressure on the packing and besides functions only to increase compression on the packing as the valve is moved towards its closed position. Such a construction is to be distinguished from ours in that ours provides a continuous or a constant pressure and that no additional pressure is placed on the packing when it is not desirable to increase compression on the packing, i. e. when the valve is moved towards its closed position.

Attention is called to the fact that the sole function of the spring 31 is to act in conjunction with the valve stem as described herein and that it is entirely independent of the packing 21 and in no way affects the packing.

A further sealing means is provided above the diaphragm, and, as illustrated, comprises an inclined face e on the head of the actuating member 28 adapted to engage a seat s on the cap or bonnet 24.

In the drawing the valve is shown by full lines in its full open position and when the operating stem is lowered the valve is moved towards its closed position, the closed position of the valve being shown in dotted lines. The downward movement of the valve operating member depresses the diaphragm, the valve stem and valve, against the action of spring 31, and a retraction of the operating member 28 permits the spring to act to raise the valve from closed position to full open position and at the same time the diaphragm is flexed and maintained in contact with the head of the operating stem or member.

It will be noted that when the valve is in full open position three distinct sealing means are functioning to prevent any possible leakage from the valve structure; and that when the valve is in its closed position or at a point intermediate between full open and closed positions the packing 21 coacting with the take-up washer and guide sleeve 18 prevents the passage of fluid from the valve chamber into the supplemental chamber.

The valve 15 having the two contacting faces a and b for engaging the respective seats 14 and 32 is a back-seating valve and is maintained in correct seating position at all times by the elongated guide sleeve 18 constituting a very efficient bearing for the valve stem. Our construction permits the cap or bonnet 24 to be readily removed from the valve body in order to remove or insert a diaphragm and this may be accomplished without removing the valve structure from the line or even closing the valve.

An important feature of the present invention resides in forming, proportioning and positioning the valve 15 relatively to the valve chamber so as to provide for a free and unrestricted flow of fluid from the inlet, through the said valve chamber, to the outlet passage. As illustrated, it will be noted that the valve is spaced from the walls of the relatively large valve chamber and that the valve is reduced at c, thus assuring a full flow of fluid through the valve chamber when the valve is in open position.

We claim:—

1. In a valve, a valve body having a valve chamber therein, an inlet passage to the chamber, an outlet passage leading from the chamber, a valve seat, a closure for the valve chamber having a seat, a supplemental chamber, a valve in the valve chamber having spaced apart seat contacting faces for cooperation with the said seats and having a stem extending through the closure and into the supplemental chamber, a packing for the stem, an imperforate diaphragm closing the supplemental chamber, a separable adjustable elongated sleeve guide for the valve stem carried by the closure member and extending into the supplemental chamber for guiding the stem and compressing the packing, resilient means surrounding and independent of the sleeve guide for urging the valve to open position, and operating means for the valve stem above the diaphragm.

2. In a valve, a valve body having a valve chamber therein, an inlet passage to the chamber, an outlet passage leading from the chamber, a valve seat, a closure for the valve chamber having a packing receiving pocket, a supplemental chamber in the valve body separated by said closure from the valve chamber, a stem packing in said pocket, a valve in the valve chamber for coaction with the seat and having a stem extending through the closure and into the supplemental chamber, an imperforate diaphragm closing the supplemental chamber, an elongated sleeve guide for the stem having an end engaging the packing, a spring surrounding the guide and independent thereof and the said packing for urging the valve to open position, and operating means for the valve stem above the diaphragm.

3. A valve as described in claim 2, in which a take-up spring metal washer is interposed between the packing and an end of the sleeve guide.

4. In a valve, a valve body having a relatively large valve chamber therein, an inlet passage to the chamber, an outlet passage leading from the chamber, a valve seat, a closure for the valve chamber, a supplemental chamber, a valve in the valve chamber spaced from the walls thereof and having a reduced portion coacting with the walls of the valve chamber to insure an unrestricted flow of fluid through the chamber, a valve stem extending through the closure and into the supplemental chamber, an imperforate diaphragm closing the supplemental chamber, an elongated sleeve guide for the valve stem carried by the closure member and projecting outwardly therefrom and extending into the supplemental chamber, a spring surrounding and independent of the sleeve for urging the valve to open position, and operating means for the valve stem above the diaphragm.

5. In a valve, a valve body having a valve chamber therein, a closure for the valve chamber, a supplemental chamber in the valve body separated by said closure from the valve chamber, a bonnet on the valve body, a valve in the valve chamber having a stem extending between the said chambers, stem operating means above the valve stem, an imperforate diaphragm closing the supplemental chamber and disposed between the bonnet and valve body and between the valve stem and said operating means, and a plurality of spaced apart sealing means coacting with the valve and its stem to effect a seal between the valve chamber and the supplemental chamber whereby the diaphragm may be removed while the valve is in operation, one of the said sealing means comprising a packing, and means for compressing the packing operable independently of the movement of the valve stem.

6. In a valve, a valve body having a valve chamber therein, a closure for the valve chamber, a supplemental chamber spaced from the valve chamber, a bonnet on the valve body, a valve in the valve chamber having a stem extending between the said chambers, stem operating means above the valve stem, an imperforate diaphragm closing the supplemental chamber and disposed between the valve stem and said operating means, a sealing means between the valve and closure, a packing for the stem carried by the closure, an elongated sleeve guide for the stem above the packing and cooperating therewith to compress the packing independently of the movement of the valve stem, and a sealing means between the bonnet and stem operating means.

7. In a valve, a valve body having a valve chamber therein, a closure for the valve chamber, a supplemental chamber spaced from the valve chamber, a valve in the valve chamber having a stem extending through said closure between the said chambers, stem operating means above the valve stem, an imperforate diaphragm closing the supplemental chamber and disposed between the valve stem and said operating means, a valve stem packing carried by the closure to effect a seal between the valve chamber and the supplemental chamber whereby the diaphragm may be removed while the valve is in operation, and means for compressing the packing operable independently of the movement of the valve stem.

JOHN S. FORBES.
HARRY H. LAMAR.